United States Patent
Suemitsu et al.

(10) Patent No.: US 11,951,710 B2
(45) Date of Patent: Apr. 9, 2024

(54) RADIATIVE COOLING DEVICE

(71) Applicant: Osaka Gas Co., Ltd., Osaka (JP)

(72) Inventors: Masahiro Suemitsu, Osaka (JP); Tadashi Saito, Osaka (JP)

(73) Assignee: Osaka Gas Co., Ltd., Osaka (JP)

( * ) Notice: Subject to any disclaimer, the term of this patent is extended or adjusted under 35 U.S.C. 154(b) by 899 days.

(21) Appl. No.: 16/962,581

(22) PCT Filed: Jan. 17, 2019

(86) PCT No.: PCT/JP2019/001337
§ 371 (c)(1),
(2) Date: Jul. 16, 2020

(87) PCT Pub. No.: WO2019/142876
PCT Pub. Date: Jul. 25, 2019

(65) Prior Publication Data
US 2020/0398531 A1    Dec. 24, 2020

(30) Foreign Application Priority Data
Jan. 19, 2018    (JP) .................. 2018-007418

(51) Int. Cl.
*B32B 15/04*    (2006.01)
*B32B 17/06*    (2006.01)
(Continued)

(52) U.S. Cl.
CPC ............ *B32B 15/04* (2013.01); *B32B 17/061* (2013.01); *F28F 13/18* (2013.01); *F28F 21/08* (2013.01);
(Continued)

(58) Field of Classification Search
CPC .......... G02B 5/26; B32B 17/06; B32B 15/04; B32B 17/061; B32B 2307/416;
(Continued)

(56) References Cited

U.S. PATENT DOCUMENTS 6,587,263 B1 †   7/2003   Iacovangelo
9,134,467 B2     9/2015   Krasnov et al.
(Continued)

FOREIGN PATENT DOCUMENTS

CN    103794665 A  †  5/2014
CN    104459848 A  †  3/2015
(Continued)

OTHER PUBLICATIONS

Sakata, Recent Progress in Glass Surface Treatments—Improvement in Mechanical and Optical Properties, Journal of the Ceramic Society of Japan, Aug. 30, 1978, pp. 19-27, 88 (12).

*Primary Examiner* — Ana M Vazquez
(74) *Attorney, Agent, or Firm* — The Webb Law Firm

(57) ABSTRACT

A radiative cooling device that can cool a cooling target appropriately with cost reduction of its light reflective layer. An infrared radiative layer for radiating infrared light from a radiative surface and a light reflective layer located on the opposite side of the presence side of the radiative surface of the infrared radiative layer are provided in a mutually stacked manner. The light reflective layer is arranged such that a first layer made of silver or silver alloy and a second layer made of aluminum or aluminum alloy are stacked, with the first layer being disposed on the side close to the infrared radiative layer.

7 Claims, 14 Drawing Sheets

(51) Int. Cl.
*F28F 13/18* (2006.01)
*F28F 21/08* (2006.01)

(52) U.S. Cl.
CPC ..... *B32B 2250/05* (2013.01); *B32B 2307/416* (2013.01); *B32B 2307/732* (2013.01); *B32B 2311/08* (2013.01); *B32B 2311/24* (2013.01); *F28F 2245/06* (2013.01)

(58) Field of Classification Search
CPC .............. B32B 2311/08; B32B 2311/24; F28F 2245/06; F28F 13/18; F28F 21/08
See application file for complete search history.

(56) References Cited

U.S. PATENT DOCUMENTS 10,126,020 B2 † 11/2018 Yuste
2009/0195865 A1 † 8/2009 Kleideiter
2015/0338175 A1 † 11/2015 Raman

FOREIGN PATENT DOCUMENTS

| | | | | |
|---|---|---|---|---|
| JP | H7174917 A | 7/1995 | | |
| JP | 2003114313 A | 4/2003 | | |
| JP | 2006317603 A | 11/2006 | | |
| JP | 200786118 A | 4/2007 | | |
| JP | 2007086118 A * | 4/2007 | | |
| WO | 2014078223 A1 | 5/2014 | | |
| WO | 2016/205717 A1 † | 12/2016 | | |
| WO | 2016205717 A1 | 12/2016 | | |
| WO | WO-2016205717 A1 * | 12/2016 | ............. | B32B 27/18 |
| WO | 2017/151514 A1 † | 9/2017 | | |

\* cited by examiner
† cited by third party

Fig.4

| thickness of silver | silver alone | silver + aluminum |
|---|---|---|
| 300 nm | 68.7 W/m² | 68.7 W/m² |
| 100 nm | 65.7 W/m² | 69.0 W/m² |
| 90 nm | 64.4 W/m² | 69.2 W/m² |
| 80 nm | 62.2 W/m² | 69.3 W/m² |
| 70 nm | 58.3 W/m² | 69.3 W/m² |
| 60 nm | 51.4 W/m² | 69.2 W/m² |
| 50 nm | 38.4 W/m² | 68.5 W/m² |
| 40 nm | 13.5 W/m² | 66.5 W/m² |
| 30 nm | -175.6 W/m² | 61.5 W/m² |
| 20 nm | -36.5 W/m² | 49.7 W/m² |
| 10 nm | -396.3 W/m² | 25.5 W/m² |
| 5 nm | -648.9 W/m² | 7.1 W/m² |
| 3.3 nm | -759.8 W/m² | 0.0 W/m² |
| 1 nm | -901.8 W/m² | -10.1 W/m² |
| 0 nm | -931.3 W/m² | -14.7 W/m² | positive : cooling, negative : heating

| membrane thickness of silver | wavelength crossed with reflectance of 200 nm aluminum |
|---|---|
| 200 nm | 380 nm |
| 100 nm | 390 nm |
| 60 nm | 440 nm |
| 50 nm | 470 nm |
| 40 nm | 540 nm |
| 30 nm | 680 nm |
| 20 nm | 820 nm |

RADIATIVE COOLING DEVICE

CROSS-REFERENCE TO RELATED APPLICATIONS

This application is the United States national phase of International Application No. PCT/JP2019/001337 filed Jan. 17, 2019, and claims priority to Japanese Patent Application No. 2018-007418 filed Jan. 19, 2018, the disclosures of which are hereby incorporated by reference in their entirety.

TECHNICAL FIELD

The present invention relates to a radiative cooling device configured such that an infrared radiative layer for radiating infrared light from a radiative surface and a light reflective layer disposed on the opposite to the presence side of the radiative surface of the infrared radiative layer are provided in a mutually stacked state.

BACKGROUND ART

Such radiative cooling device is provided for use in cooling various kinds of cooling targets or objects, with an arrangement e.g. that infrared light (radiation) radiated from the radiative surface of the infrared radiative layer is transmitted through the atmospheric window (e.g. a window that allows transmission therethrough of infrared light having wavelengths ranging from 8 to 13 µm), thereby to cool a cooling target (a target or an object to be cooled) located on the side of the light reflective layer opposite to the presence side of the infrared radiative layer.

By the way, the light reflective layer reflects the light (visible light, ultraviolet light, infrared light) transmitted through the infrared radiative layer from the radiative surface, thus preventing such light (visible light, ultraviolet light, infrared light) transmitted through the infrared radiative layer from being projected onto the cooling target to heat this cooling target.

Incidentally, the light reflective layer has a further function of reflecting not only the light transmitted through the infrared radiative layer, but also the infrared light radiated from the infrared radiative layer to the presence side of the light reflective layer back toward the infrared radiative layer. However, the following explanation will be made on a premise that the light reflective layer is provided for the purpose of reflecting the light (visible light, ultraviolet light, infrared light) transmitted through the infrared radiative layer.

As a first conventional example of such radiative cooling device, there is known one configured such that its light reflective layer comprises a metal layer formed of silver and a photon bandgap layer which is provided as a multilayered assembly of a titanium dioxide (TiO$_2$) layer and a magnesium fluoride (MgF$_2$) layer disposed in alternation, the metal layer and the photon bandgap layer being stacked, with the photo bandgap layer being disposed on the side close to the infrared radiative layer (see e.g. International Patent Application Publication No. WO 2014/078223).

As a second conventional example of such radiative cooling device, there is known one configured such that its light reflective layer comprises a metal layer formed of aluminum (see e.g. Japanese Unexamined Patent Application Publication JP Hei. 7-174917).

Incidentally, in Japanese Unexamined Patent Application Publication JP Hei. 7-174917, the metal layer formed of aluminum is used as a substrate, on which an SiO layer and an MgO layer together constituting an infrared radiative layer are stacked.

SUMMARY OF THE INVENTION

In the case of the first conventional example, since the light reflective layer includes a photon bandgap layer in the form of a multi-layered stacked assembly, there was a disadvantage of the manufacture being troublesome. Moreover, if such photo bandgap layer is to be provided, as it is difficult to form the metal layer made of silver sufficiently thin, the arrangement will suffer a disadvantage of cost reduction of the entire arrangement being difficult.

In the case of the second conventional example, its light reflective layer is comprised of a metal layer made of aluminum. Thus, as the light reflective is made of aluminum which is inexpensive, cost reduction of the general arrangement is possible.

However, since the metal layer made of aluminum is more absorptive to light than silver, the light transmitted through the infrared radiative layer will be absorbed in the metal layer made of aluminum, so that due to e.g. heating of the cooling target by the metal layer which is heated by this absorption of light, appropriate cooling of the cooling target may not be possible.

In view of the above-described state of the art, the present inventors have conducted extensive and intensive study, according to which it was discovered that if the light reflective layer is constituted of a metal layer made of silver having a thickness equal to or greater than 100 nm, cooling of a cooling target is possible with effective suppression of projection of light transmitted through the infrared radiative layer onto the cooling target (see FIG. 9 and FIG. 10) and that if the light reflective layer is constituted of a metal layer made of silver having a thickness equal to or greater than 300 nm, appropriate cooling of a cooling target is possible with reliable suppression of projection of light transmitted through the infrared radiative layer onto the cooling target.

Notwithstanding the above, silver is an expensive metal. Thus, if the light reflective layer is constituted of a metal layer made of silver having a thickness equal to or greater than 300 nm, this will make the radiative cooling device expensive. Thus, there has been a need to cool a cooling target with maximum saving of the amount of silver to be used.

The present invention has been made in view of the above and its object is to provide a radiative cooling device that can cool a cooling target appropriately with cost reduction of its light reflective layer.

According to the present invention, there is provided a radiative cooling device configured such that an infrared radiative layer for radiating infrared light from a radiative surface and a light reflective layer disposed on the opposite to the presence side of the radiative surface of the infrared radiative layer are provided in a mutually stacked state, the radiative cooling device being characterized in that:

the light reflective layer is arranged such that a first layer made of silver or silver alloy and a second layer made of aluminum or aluminum alloy are stacked with the first layer being disposed on the side close to the infrared radiative layer.

Namely, according to the extensive and intensive research made by the present inventors, it has been discovered that if the light reflective layer is arranged such that a first layer made of silver or silver alloy and a second layer made of aluminum or aluminum alloy are stacked with the first layer being disposed on the side close to the infrared radiative layer, it becomes possible to cool a cooling target while suppressing the amount of expensive silver or silver alloy to be used.

More particularly, silver or silver alloy is advantageous for its capacity to reflect visible light and/or infrared light efficiently, but disadvantageous for its ultraviolet light reflectance tending to be low.

On the other hand, aluminum or aluminum alloy is not able to reflect visible light and/or infrared light efficiently in comparison with silver or silver alloy, but advantageous for its tendency to reflect ultraviolet light efficiently.

Moreover, aluminum or aluminum alloy, in comparison with silver or silver alloy, has a tendency of easily absorbing visible light and/or infrared light.

Then, it has been found that by stacking a first layer made of silver or silver alloy and a second layer made of aluminum or aluminum alloy with disposing the first layer on the side close to the infrared radiative layer, the first layer reflects the visible light or infrared light to suppress absorption of the visible light and/or infrared light by the second layer, and moreover, even if the thickness of the first layer is reduced, thanks to the existence of the first layer and the second layer, the light (visible light, ultraviolet light, infrared light) transmitted through the infrared radiative layer can be reflected appropriately, so that the cooling target can be cooled.

And, since the first layer made of silver or silver alloy can be formed thin, cost reduction of the light reflective layer is made possible.

In short, with the radiative cooling device according to the present invention, a cooling target can be cooled with cost reduction of its light reflective layer.

According to a further characterizing feature of the radiative cooling device of the present invention, the first layer has a thickness greater than 3.3 nm and equal to or less than 100 nm.

Namely, it has been found that even if the thickness of the first layer made of silver or silvery alloy is varied in the range greater than 3.3 nm and equal to or less than 100 nm, thanks to the presence of the second layer, the light (visible light, ultraviolet light, infrared light) transmitted through the infrared radiative layer can still be reflected appropriately, thus being able to cool the cooling target.

That is, by setting the thickness of the first layer made of silver or silver alloy greater than 3.3 nm and equal to or less than 100 nm, cooling of the cooling target is possible with sufficient reduction in the cost of the light reflective layer.

More particularly, if the thickness of the first layer made of silver or silver alloy is set greater than 30 nm, within the range from greater than 3.3 nm to equal to or less than 100 nm, it becomes possible to cool the cooling target appropriately.

In short, according to the further characterizing feature of the radiative cooling device of the present invention, cooling of the cooling target is possible with sufficient reduction in the cost of the light reflective layer.

According to a still further characterizing feature of the radiative cooling device of the present invention, the thickness of the first layer is equal to or greater than 50 nm and equal to or less than 100 nm.

That is, it has been found that by setting the thickness of the first layer made of silver or silver alloy equal to or greater than 50 nm and equal to or less than 100 nm, while the reflective function for the light (mainly, visible light, infrared light) by the first layer is allowed to be achieved appropriately, thanks to the presence of the second layer, the light (visible light, ultraviolet light, infrared light) transmitted through the infrared radiative layer can be reflected appropriately, as a result of which the cooling target can be cooled by a capacity equivalent to that of constituting the light reflective layer of a metal layer made of silver and having a thickness equal to or greater than 300 nm.

Therefore, while achieving cost reduction of the light reflective layer through reduction of the thickness of the first layer, cooling capacity equivalent to that of the case of constituting the light reflective layer of a metal layer made of silver and having a thickness equal to or greater than 300 nm can be obtained.

In short, according to the still further characterizing feature of the present invention, high cooling capacity can be obtained while achieving cost reduction of the light reflective layer.

According to a still further characterizing feature of the radiative cooling device of the present invention, the second layer has a thickness equal to or greater than 10 nm.

Namely, it has been found that in case the light reflective layer is to be constituted of a first layer and a second layer, if the thickness of the second layer made of aluminum or aluminum alloy is equal to or greater than 10 nm, while the function of the second layer for reflecting ultraviolet light is allowed to be achieved appropriately, thanks to the combination with the first layer, the light (visible light, ultraviolet light, infrared light) transmitted through the infrared radiative layer can be reflected appropriately.

Incidentally, the thickness of the second layer made of aluminum or aluminum alloy may be any as long as it is equal to or greater than 10 nm. However, in order to suppress the amount of aluminum or aluminum alloy to be used, it is necessary to avoid increasing the thickness more than necessary.

In short, according to the still further characterizing feature of the radiative cooling device of the present invention, while the function of the second layer for reflecting ultraviolet light is allowed to be achieved appropriately, the light transmitted through the infrared radiative layer can be reflected appropriately.

According to a still further characterizing feature of the radiative cooling device of the present invention, the infrared radiative layer comprises glass selected from the group consisting of alkali free glass, crown glass and borosilicate glass.

Namely, alkali free glass, crown glass and borosilicate glass are relatively inexpensive, yet being superior in the transmittance of solar light (visible light, ultraviolet light, near infrared light) (i.e. transmitting about 80% thereof). So, they do not absorb solar light and also have the property of high light radiation intensity of radiating infrared light having wavelengths corresponding to the atmospheric window (e.g. window that transmits infrared light having a wavelength ranging from 8 to 13 μm).

Therefore, by constituting the infrared radiative layer of any glass selected from the group consisting of alkali free glass, crown glass and borosilicate glass, it is possible to obtain a radiative cooling device having high cooling capacity while achieving cost reduction in the general arrangement.

In short, according to the still further characterizing feature of the radiative cooling device of the present invention, it is possible to obtain improvement in the cooling capacity while achieving cost reduction in the general arrangement.

According to a still further characterizing feature of the radiative cooling device of the present invention, the infrared radiative layer is used as a substrate, on which the first layer and the second layer are stacked.

Namely, since the infrared radiative layer is used as a substrate and the first layer and the second layer are stacked on this substrate, it is possible to achieve thickness reduction of the general arrangement while achieving simplification of the general arrangement.

Incidentally, in case the first layer and the second layer are to be stacked on the infrared radiative layer as a substrate, if the first layer and the second layer are thin, these first and second layers will be stacked one after another by the sputtering technique or the like.

Namely, in comparison with an arrangement in which a substrate for stacking will be provided separately and on this stacking substrate the second layer and the first layer are stacked one after another by e.g. the sputtering technique or the like, after which at the portion of the first layer on the opposite side to the presence side of the second layer, an infrared radiative layer separately fabricated will be placed to be stacked thereon or in which the infrared radiative layer is stacked by the sputtering technique or the like at the portion of the first layer on the opposite side to the presence side of the second layer, there is no need to provide a stacking substrate. Consequently, it is possible to achieve simplification of the general arrangement and also to achieve simplification of the general arrangement.

In short, according to the still further characterizing feature of the radiative cooling device of the present invention, it is possible to achieve simplification of the general arrangement and also to achieve simplification of the general arrangement.

According to a still further characterizing feature of the radiative cooling device of the present invention, a gapless contact layer is stacked between the infrared radiative layer and the first layer.

Namely, since a gapless contact layer is stacked between the infrared radiative layer and the first layer of the light reflective layer, it is possible to suppress occurrence of damage such as peeling-off of the first layer of the light reflective layer from the infrared radiative layer due to e.g. temperature change, etc. Thus, durability can be improved.

In short, according to the still further characterizing feature of the radiative cooling device of the present invention, durability can be improved.

According to a still further characterizing feature of the radiative cooling device of the present invention, on the side of the second layer opposite to the presence side of the first layer, an anti-oxidization layer is stacked.

Namely, on the side of the second layer made of aluminum or aluminum alloy opposite to the presence side of the first layer, an anti-oxidization layer is stacked. Therefore, even if the second layer is formed thin, oxidization deterioration of the second layer can be suppressed, so that the durability can be improved.

In short, according to the still further characterizing feature of the radiative cooling device of the present invention, deterioration of the second layer made of aluminum or aluminum alloy can be suppressed, whereby the durability can be improved.

BRIEF DESCRIPTION OF THE DRAWINGS

FIG. 4 is a table showing cooling capacity of the radiative cooling device.

DESCRIPTION OF THE INVENTION

Next, an embodiment of the present invention will be explained with reference to the accompanying drawings.

[Arrangement of Radiative Cooling Device]

Figure 1:
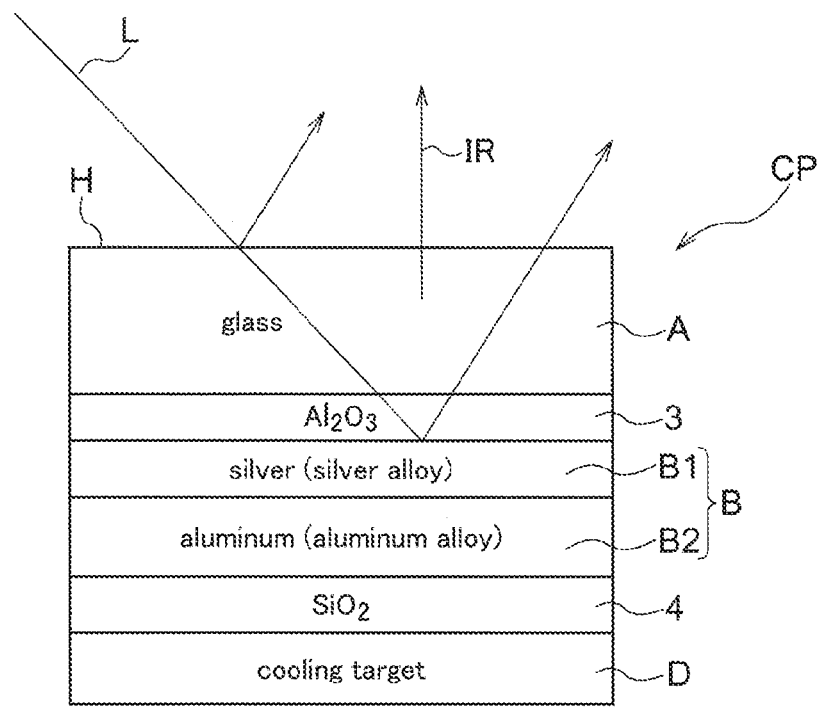
FIG. 1 is a view showing an arrangement of a radiative cooling device.

As shown in FIG. 1, a radiative cooling device CP includes an infrared radiative layer A for radiating infrared light (infrared radiation) IR from a radiative surface H thereof and a light reflective layer B disposed on the opposite to the presence side of the radiative surface H of the infrared radiative layer A in a mutually stacked state.

The light reflective layer B includes a first layer B1 made of silver or silver alloy and a second layer B2 made of aluminum or aluminum alloy (to be referred to simply as "aluminum" hereinafter), the first layer B1 and the second layer B2 being stacked, with the first layer B1 being positioned on the side close to the infrared radiative layer A.

The first layer B1 has a thickness (membrane thickness) greater than 3.3 nm and equal to or less than 100 nm. Preferably, the thickness (membrane thickness) of the first layer B1 is set to be equal to or greater than 50 nm and equal to or less than 100 nm.

The thickness (membrane thickness) of the second layer B2 is set to be equal to or greater than 10 nm.

Incidentally, as the "silver alloy", it is possible to employ an alloy made of silver added with any one or more of copper, palladium, gold, zinc, tin, magnesium, nickel, titanium by a ratio from 0.4 to 4.5 mass % approximately. As a specific example, it is possible to employ "APC-TR" (manufactured by Furuya Metal Co., Ltd.), which is a silver alloy prepared by adding copper and palladium to silver.

Incidentally, in the following description, explanation will be made on a premise of using silver to constitute the first layer B1.

As the "aluminum alloy", it is possible to employ an alloy made of aluminum added with any one or more of copper, manganese, silicon, magnesium, zinc, carbon steel for machine structure, yttrium, lanthanum, gadolinium, terbium.

Incidentally, in the following description, explanation will be made on a premise of using aluminum to constitute the second layer B2.

Further, the radiative cooling device CP is configured such that the infrared radiative layer A is employed as a substrate, on which the first layer B1 and the second layer B2 are stacked.

More particularly, between the infrared radiative layer A as the substrate and the first layer B1, a gapless contact layer 3 is stacked and also on the side of the second layer B2 opposite to the presence side of the first layer B1, an anti-oxidization layer 4 is stacked.

Specifically, the radiative cooling device CP is produced by forming and stacking the gapless contact layer 3, the first layer B1, the second layer B2 and the anti-oxidization layer 4 one after another by e.g. a sputtering technique on the infrared radiative layer A as a substrate.

The gapless contact layer 3 is prepared by forming aluminum oxide ($Al_2O_3$) in the form of a membrane of 20 to 100 nm.

The anti-oxidization layer 4 is prepared by forming silicon dioxide ($SiO_2$) or aluminum dioxide ($Al_2O_3$) in the form of a membrane of 10 to several 100 nm's.

Incidentally, in the following description, explanation will be made on a premise of a membrane of silicon dioxide ($SiO_2$) being formed.

The infrared radiative layer A is constituted of glass of any one of alkali free glass, crown glass and borosilicate glass.

Incidentally, as alkali free glass, it is possible to employ e.g. OA10G (manufactured by Nippon Electric Glass Co., Ltd.). As crown glass, it is possible to employ e.g. B270 (registered trademark, same as below). As borosilicate glass, it is possible to employ e.g. TEMPAX (registered trademark, same as below).

Figure 5:
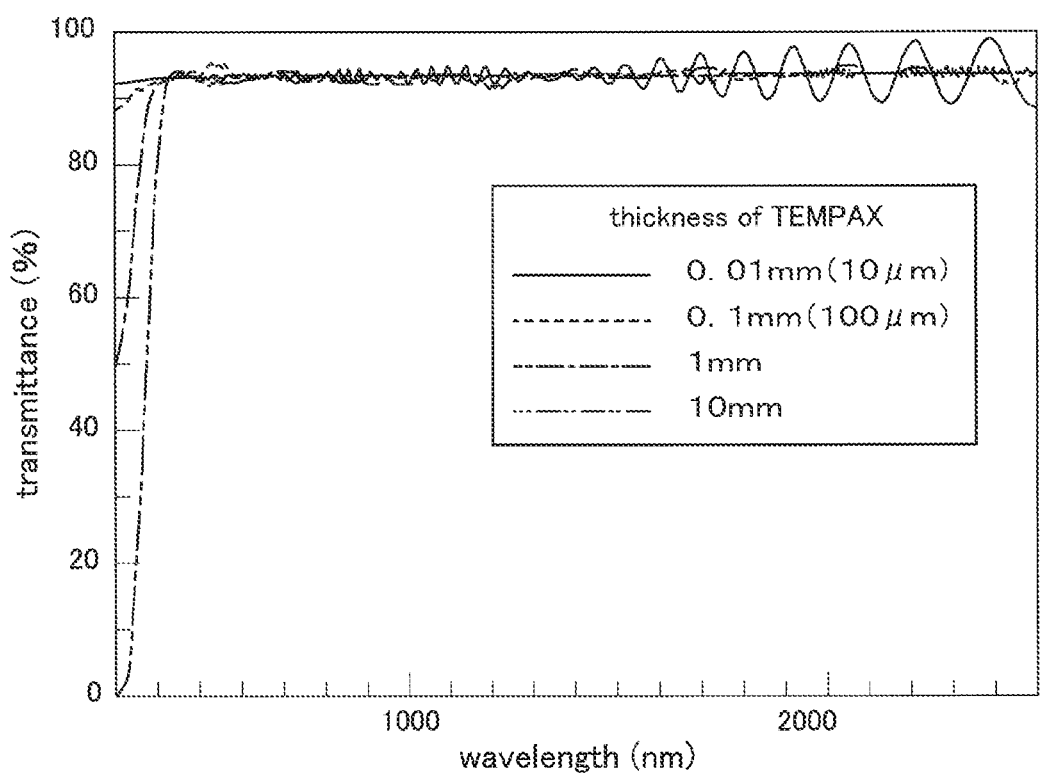
FIG. 5 is a graph showing transmittance of respective kinds of glass constituting the infrared radiative layer.
Figure 6:
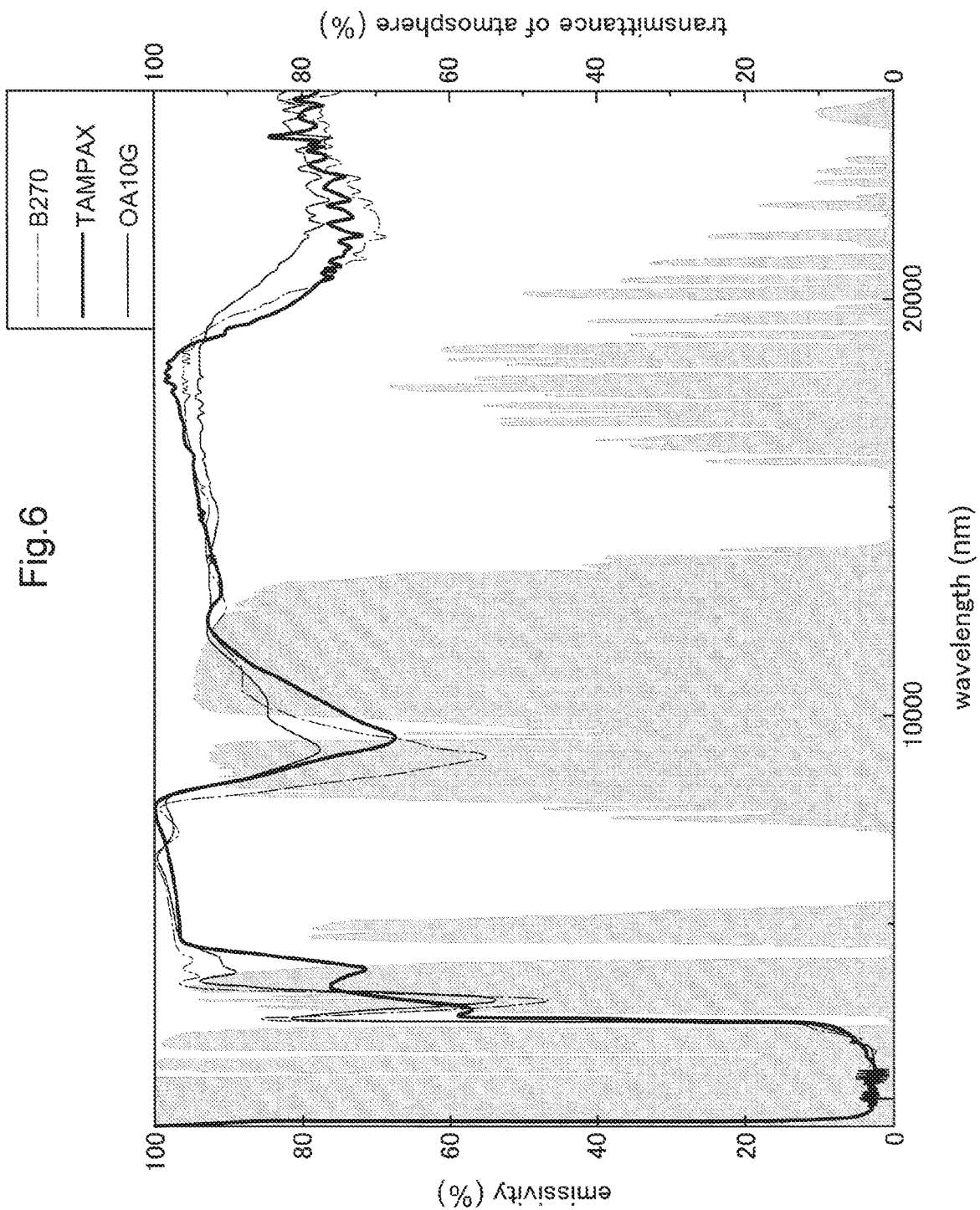
FIG. 6 is a graph showing emissivity of respective kinds of glass constituting the infrared radiative layer.

The "OA10G", "B270" and "TEMPAX", as shown in FIG. 5, all have high transmittance for light having wavelengths corresponding to the solar light and have also high emissivity for the wavelength corresponding to the wavelength range of high transmittance for the atmosphere (so called "atmospheric window) as shown in FIG. 6.

Incidentally, FIG. 5 shows "TEMPAX" as an example, however, same is true with "OA10G", "B270", etc.

Incidentally, in the following description, explanation will be made on a premise of the infrared radiative layer A being formed of "TEMPAX".

Therefore, the radiative cooling device CP is configured to reflect a part(s) (e.g. a part(s) of the solar light) of light L incident on this radiative cooling device CP by the radiative surface H of the infrared radiative layer A and to reflect the light (e.g. ultraviolet light) transmitted through the infrared radiative layer A of the light L incident on the radiative cooling device CP by the light reflective layer B.

And, the heat input to the radiative cooling device CP from a cooling target D positioned on the side of the anti-oxidization layer 4 opposite to the presence side of the light reflective layer B (e.g. heat input due to heat conduction from the cooling target D) is converted into infrared light (radiation) IR by the infrared radiative layer A to be radiated as such, thereby to cool the cooling target D.

Incidentally, in the instant embodiment, the term "light" means electromagnetic waves having wavelengths ranging from 10 nm to 20000 nm. Namely, the light L is inclusive of ultraviolet light, infrared light and the visible light.

[Result of Use of Radiative Cooling Device]

Figures 19, 20:
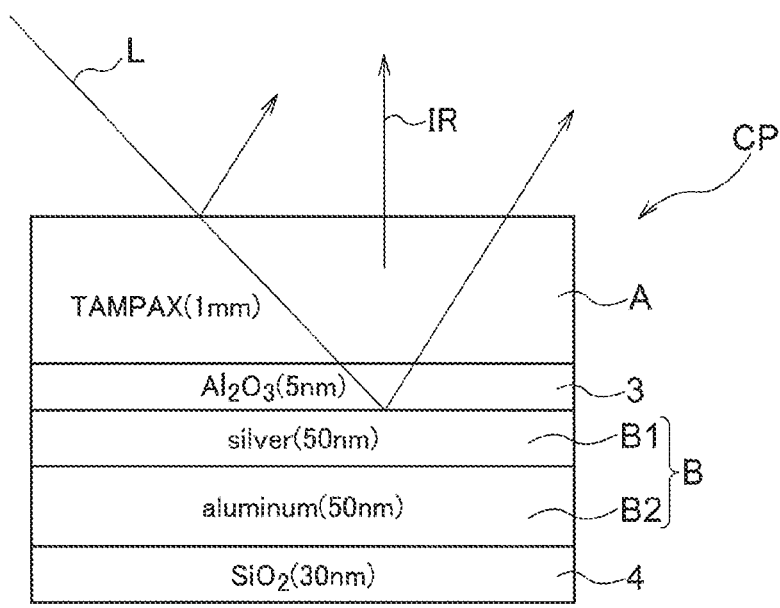
FIG. 19 is a table showing wavelengths where the reflectance of silver is lower than the reflectance of aluminum.
FIG. 20 is a view showing an embodiment arrangement of the radiative cooling device.
Figure 21:
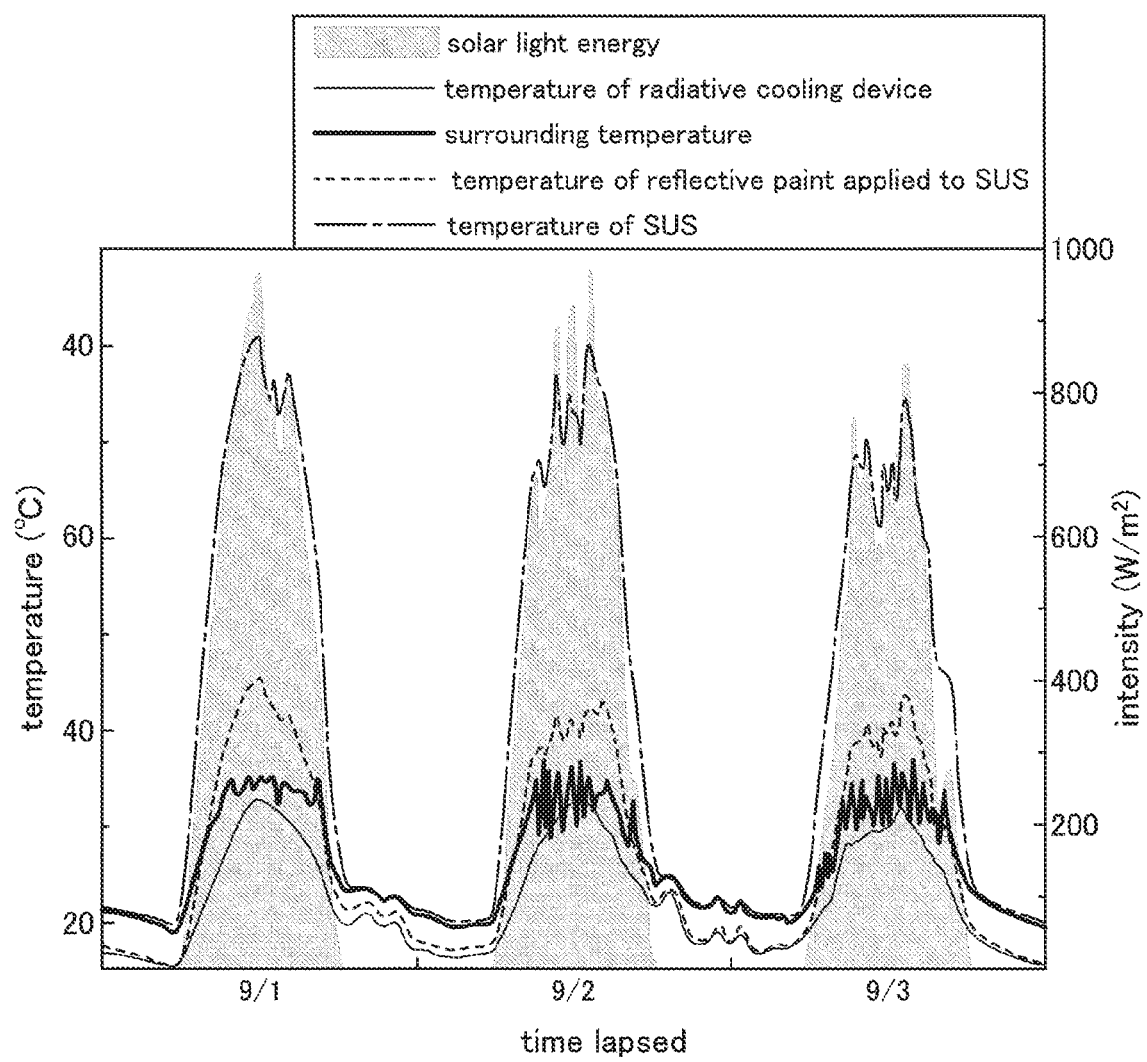
FIG. 21 is a graph showing actual temperature changes of the radiative cooling device of the embodiment arrangement.

As shown in FIG. 20, the radiative cooling device CP was constructed by forming the infrared radiative layer A with using TEMPAX having thickness of 1 mm, the light reflective layer B with using a first layer B1 of silver having a membrane thickness of 50 nm and a second layer B2 of aluminum having a membrane thickness of 50 nm and forming the gapless contact layer 3 with using aluminum oxide ($Al_2O_3$) having a membrane thickness of 5 nm, and forming the anti-oxidization layer 4 with using silicon dioxide ($SiO_2$) having a membrane thickness of 30 nm. FIG. 21 shows a result of actual use of the radiative cooling device CP thus constructed.

FIG. 21 shows temperature changes of the radiative cooling device CP as its radiative cooling characteristics thereof determined in a period from September $1^{st}$ to $3^{rd}$ in 2017. As such temperature changes of the radiative cooling device CP, there are shown temperature changes on the side of the anti-oxidization layer 4 opposite to the presence side of the light reflective layer B.

The weather conditions in the period from September $1^{st}$ to $3^{rd}$ d 2017 were clear and sunny, during which the intensity of the solar light energy rose during the daytime and fell in nighttime on each day.

For better understanding of the cooling capacity (performance) of the radiative cooling device CP, FIG. 21 shows also temperature changes of a stainless steel plate (SUS) disposed aside the radiative cooling device CP, temperature changes of reflective paint applied to the stainless steel plate (SUS) painted with such reflective paint and changes in the surrounding temperature (ambient temperature).

From this result of use, it may be understood that the temperatures of the radiative cooling device CP were always 2-5° C. lower than the surrounding temperature, whereas the temperatures of the stainless plate (SUS) and the temperatures of the reflective paint applied to the stainless steel plate were higher than the surrounding temperature under the sunshine.

[Study on Radiative Cooling Device]

In a case of constituting the light reflective layer B of the first layer B1 alone (see FIG. 2) and a case of constituting the light reflective layer B of the first layer B1 and the second layer B2 (see FIG. 3), cooling capacities of the radiative cooling device CP were measured with varying the thickness of silver of the first layer B1, whereby results shown in FIG. 4 were obtained.

For the table in FIG. 4, calculations were made with using a fine day in Osaka in late August as a model.

More particularly, the calculations were made based on the model in late August, with conditions of the solar light energy of 1000 $W/m^2$, the outside temperature of 30° C., the atmosphere emissivity of 387 $W/m^2$ and the temperature of the radiative cooling device CP (the temperature of the surface of the anti-oxidization layer 4 on the opposite side to the presence side of the light reflective layer B, this temperature may be referred to as a "cooling surface temperature" hereinafter) of 30° C.

As shown in FIG. 4, in the case of constituting the light reflective layer B of the first layer B1 alone (see FIG. 2), when the thickness of silver forming the first layer B1 became equal to or less than 30 nm, the radiative cooling device CP failed to provide cooling capacity. Whereas, in the case of constituting the light reflective layer B of the first layer B1 and the second layer B2 (see FIG. 3), when the thickness of silver was greater than 3.3 nm, the radiative cooling device CP provided the cooling capacity.

Figure 2:
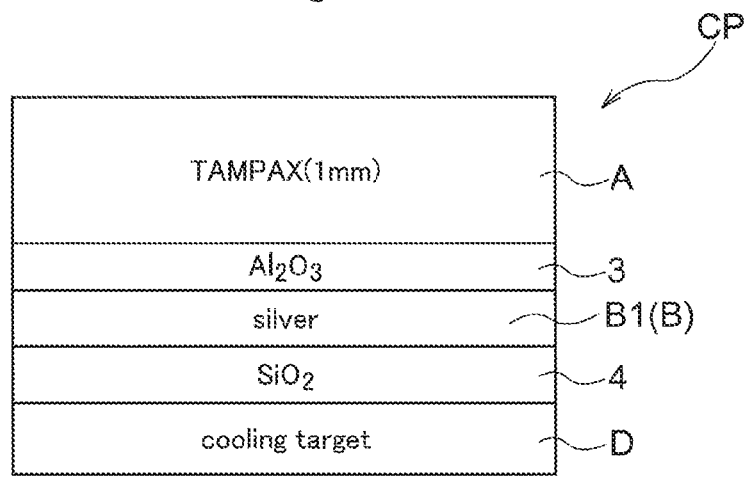
FIG. 2 is a view showing an arrangement of a radiative cooling device having a comparison arrangement.
Figure 3:
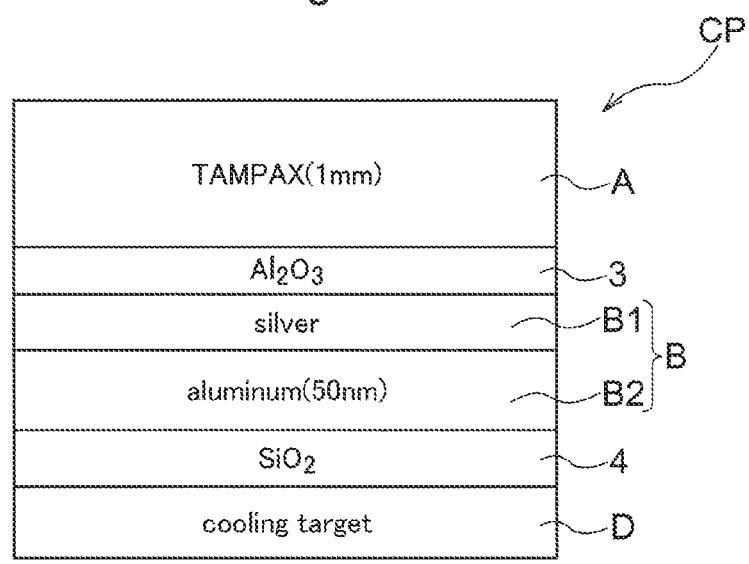
FIG. 3 is view showing an arrangement of a radiative cooling device according to an embodiment.

Moreover, in the case of constituting the light reflective layer B of the first layer B1 and the second layer B2 (see FIG. 3), when the thickness of silver was from 50 nm to 100 nm, the cooling capacities of the radiative cooling device CP were equivalent to that of a case of setting the silver thickness to 300 nm in the case of constituting the light reflective layer B of the first layer B1 alone (see FIG. 2).

Incidentally, the thickness of TEMPAX constituting the infrared radiative layer A needs to be equal to or greater than 10 μm and equal to or less than 10 cm. Preferably, the thickness is equal to or greater than 20 μm and equal to or less than 10 cm, more preferably, equal to or greater than 100 μm and equal to or less than 1 cm.

Namely, by configuring the infrared radiative layer A to exhibit high heat emissivity in the infrared range having wavelength equal to or greater than 8 μm and equal to or less than 14 μm, which heat emissivity is greater than those of AM1.5G solar light and the atmosphere which are absorbed by the infrared radiative layer A and the light reflective layer B respectively, it is possible to configure a radiative cooling device CP capable of achieving radiative cooling function providing temperature reduction relative to the surrounding atmosphere day and night.

And, to the above-described end, in case the infrared radiative layer A is formed of TEMPAX, its thickness needs to be equal to or greater than 10 μm and equal to or less than 10 cm, preferably equal to or greater than 20 μm and equal to or less than 10 cm, even more preferably equal to or greater than 100 μm and equal to or less than 1 cm.

[Supplementary Explanation of Invention]

Next, supplementary explanation will be provided on the present invention which has come to constitute the light reflective layer B of the radiative cooling device CP of the first layer B1 and the second layer B2.

Figure 7:
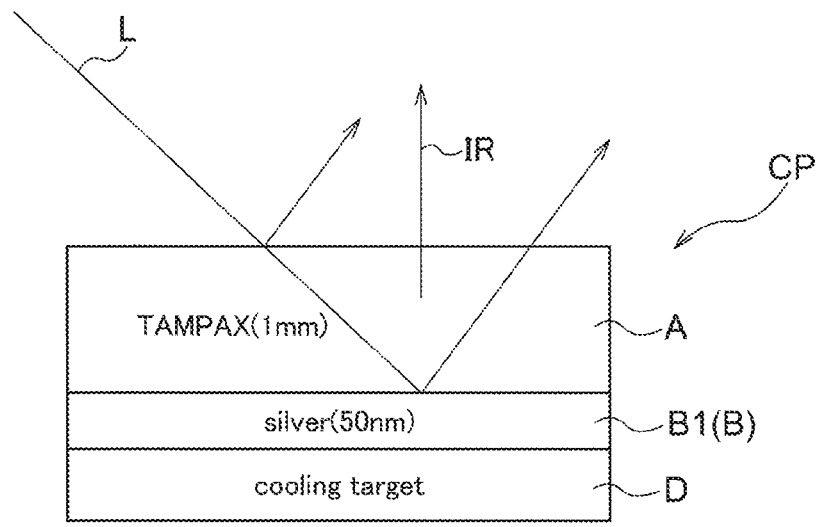
FIG. 7 is a view showing a first reference arrangement of the radiative cooling device.
Figure 8:
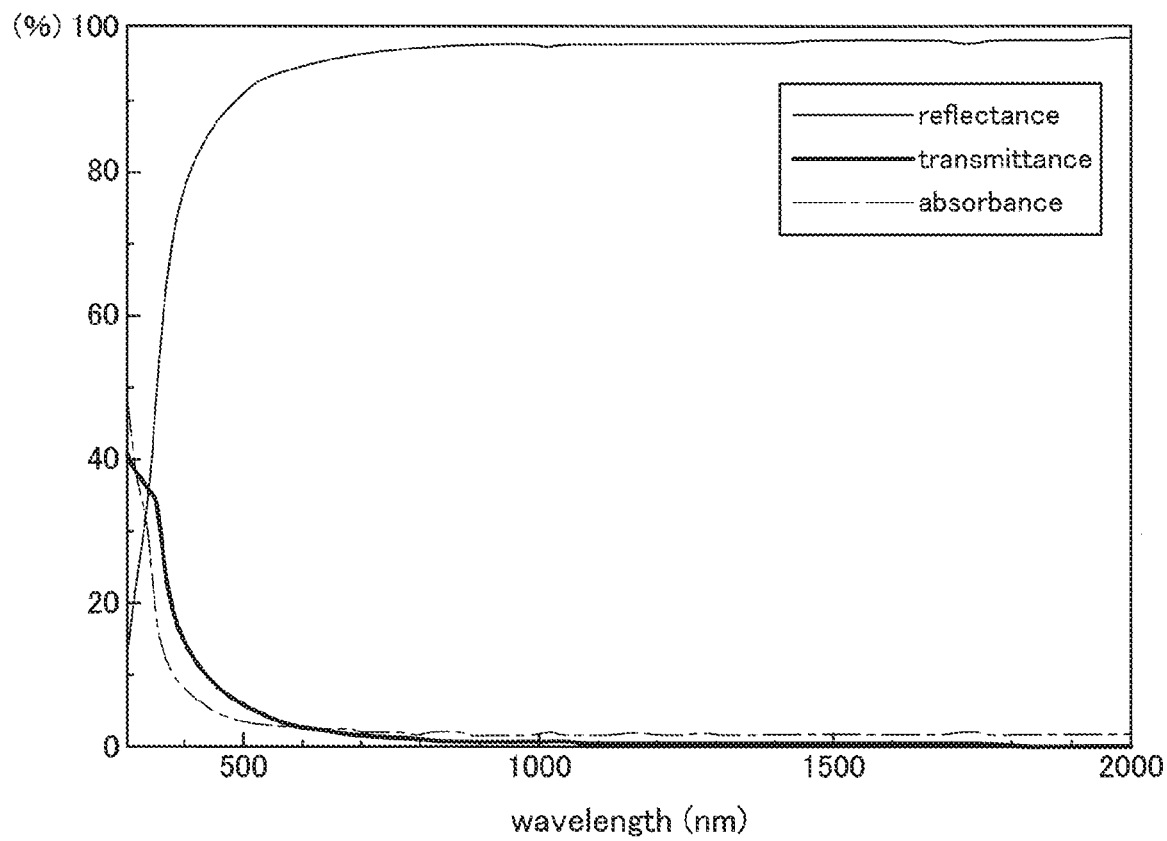
FIG. 8 is a graph showing a reflectance, a transmittance, and an absorbance relating to the first reference arrangement.

As shown in FIG. 7, in the case of constituting the light reflective layer B of the radiative cooling device CP of only the first layer B1 made of sliver having thickness of 50 nm, as shown in FIG. 8, the short-wavelength side light will be transmitted through the 50 nm silver constituting the first layer B1 and this transmitted light will be irradiated onto the cooling target D.

Figure 9:
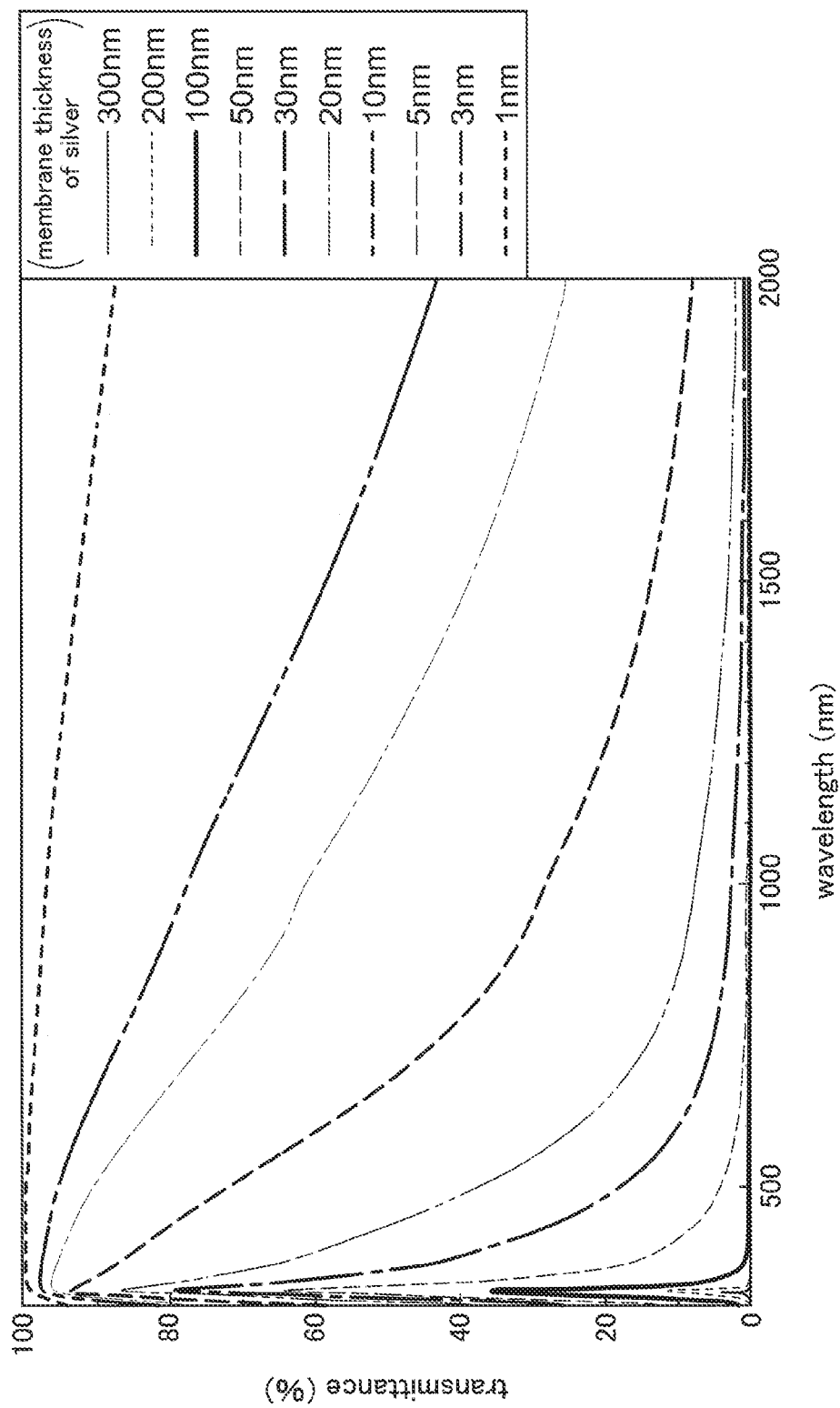
FIG. 9 is a graph showing relation between membrane thickness and transmittance of silver.

As shown in FIG. 9, with reduction in the membrane thickness (thickness) of silver, the thinner the membrane, the higher its transmittance. Thus, in the case of constituting the light reflective layer B of the first layer B1 alone, there occurs a phenomenon that the amount of light irradiated onto the cooling target D increases with reduction in the silver membrane thickness (thickness), the temperature of the cooling target D rises in spite of cooling thereof by the radiative cooling device C.

Namely, the cooling target D will be constituted as a light absorbing layer or a heat exchanger for the purpose of efficient dissipation of heat of a cooled object. However, if the membrane thickness (thickness) of silver constituting the first layer B1 is reduced, the light transmitted therethrough will heat the cooling target D, so the radiative cooling capacity (radiative cooling performance) will be lessened.

Figure 10:
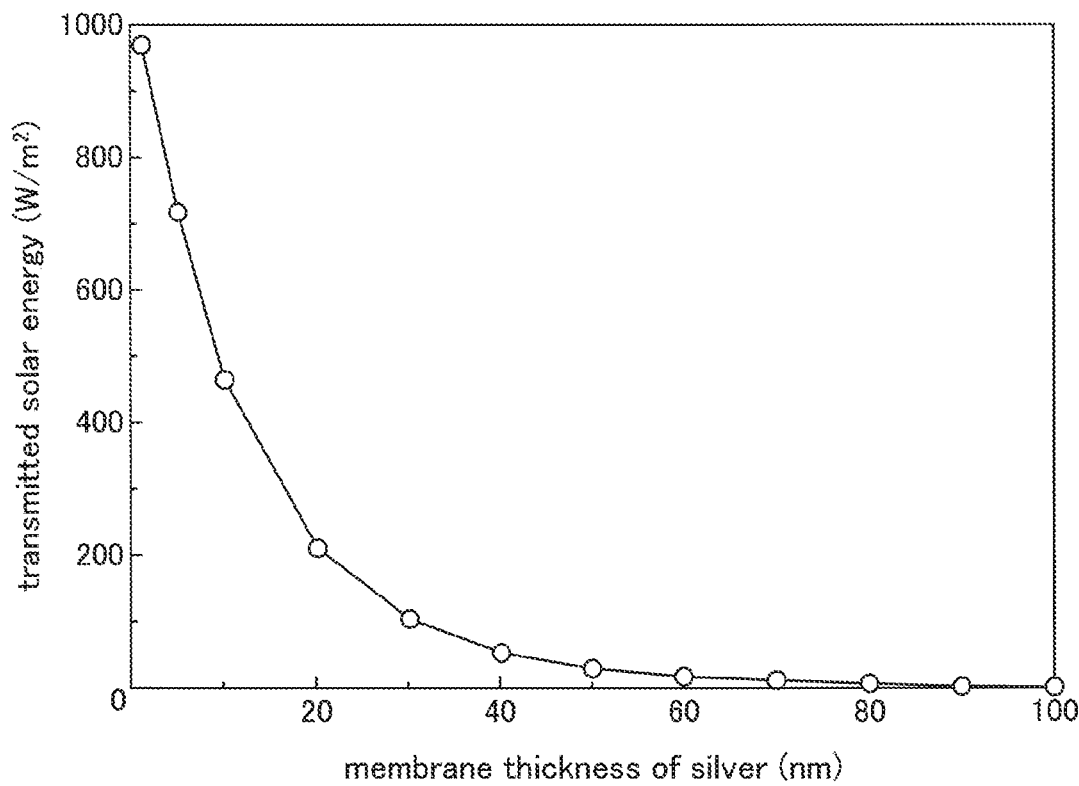
FIG. 10 is a graph showing transmitted solar light energy when the membrane thickness of silver is varied.

FIG. 10 shows the relation between the silver membrane thickness (thickness) and the transmitted solar light energy (W/m$^2$) in the radiative cooling device CP (see FIG. 7) in which the light reflective layer B is constituted of the first layer B1 made of silver.

The radiative cooling capacity of the conventional radiative cooling device CP in which the membrane thickness (thickness) of silver constituting the first layer B1 is set to 300 nm is approximately 70 W/m$^2$, at time of meridian crossing in summer in Japan, at 0 m altitude, 30° C. of outside temperature, though it may vary depending on the humidity and clearness of air.

On the other hand, when the membrane thickness (thickness) of silver constituting the first layer B1 is 100 nm, the energy of transmitted solar light becomes 7 W/m$^2$ approximately, and as this transmitted light heats the cooling target D, the radiative cooling capacity of the radiative cooling device CP will be reduced by about 10%.

Further, when the membrane thickness (thickness) of silver constituting the first layer B1 is 50 nm, the energy of transmitted solar light becomes 70 W/m$^2$ approximately, and as this transmitted light heats the cooling target D, the radiative cooling capacity of the radiative cooling device CP will be reduced significantly.

As described above, based on FIGS. 7 through 10 illustrations, explanation has been made on the problem that occurs when the membrane thickness (thickness) of the silver is reduced in the case of constituting the light reflective layer B of the first layer B1 alone.

Namely, in the case of constituting the light reflective layer B of the first layer B1 alone, it is not possible to sufficiently reduce the membrane thickness (thickness) of the silver which constitutes the first layer B1.

Figure 11:
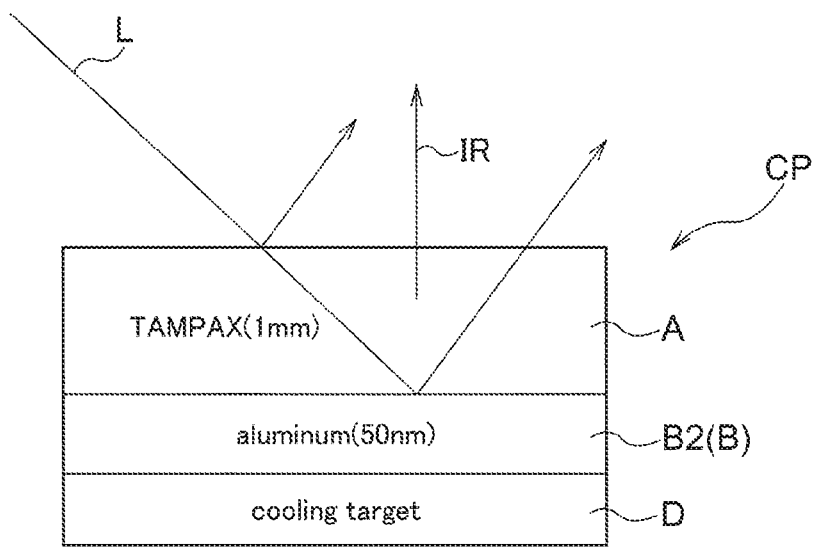
FIG. 11 is a view showing a second reference arrangement of the radiative cooling device.

Next, study will be made whether it is possible or not to substitute aluminum as a further metal for silver. Namely, since aluminum is known as a metal having a high reflectance like silver, it is conceivable to constitute the light reflective layer B of the second layer B2 alone, as shown in FIG. 11.

Figure 13:
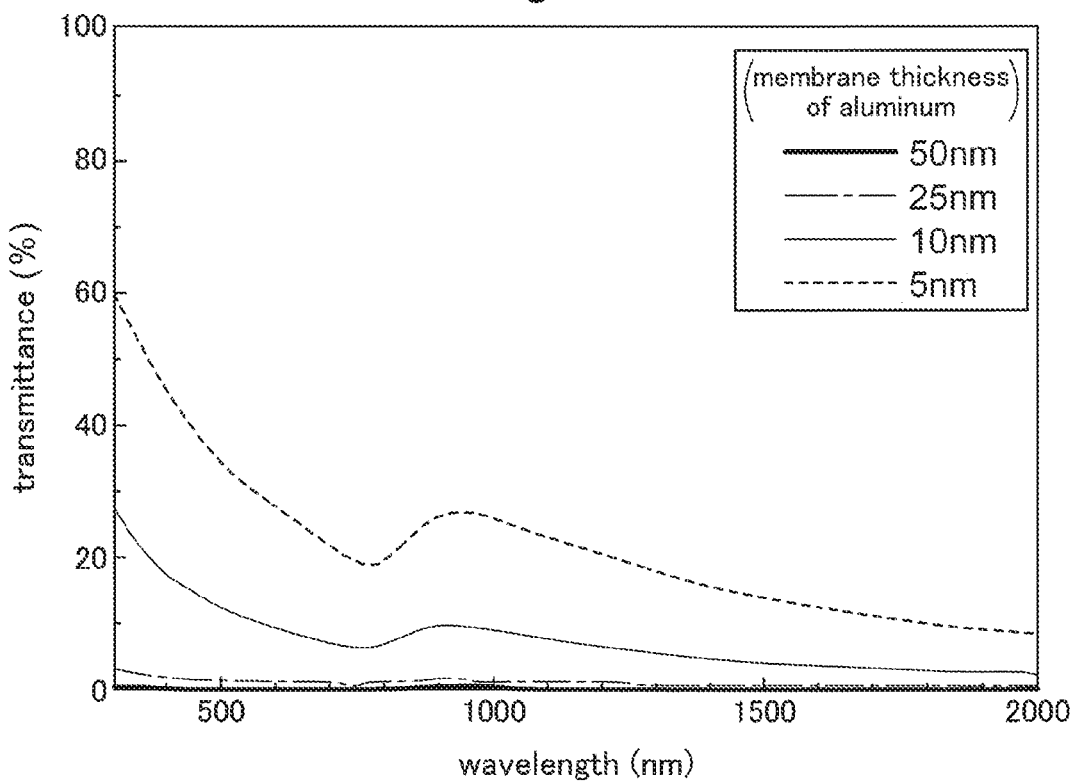
FIG. 13 is a view showing relation between membrane thickness and transmittance of aluminum.

As shown in FIG. 13, aluminum, if having a membrane thickness (thickness) equal to or greater than 25 nm, can appropriate block solar light transmission.

Figure 12:
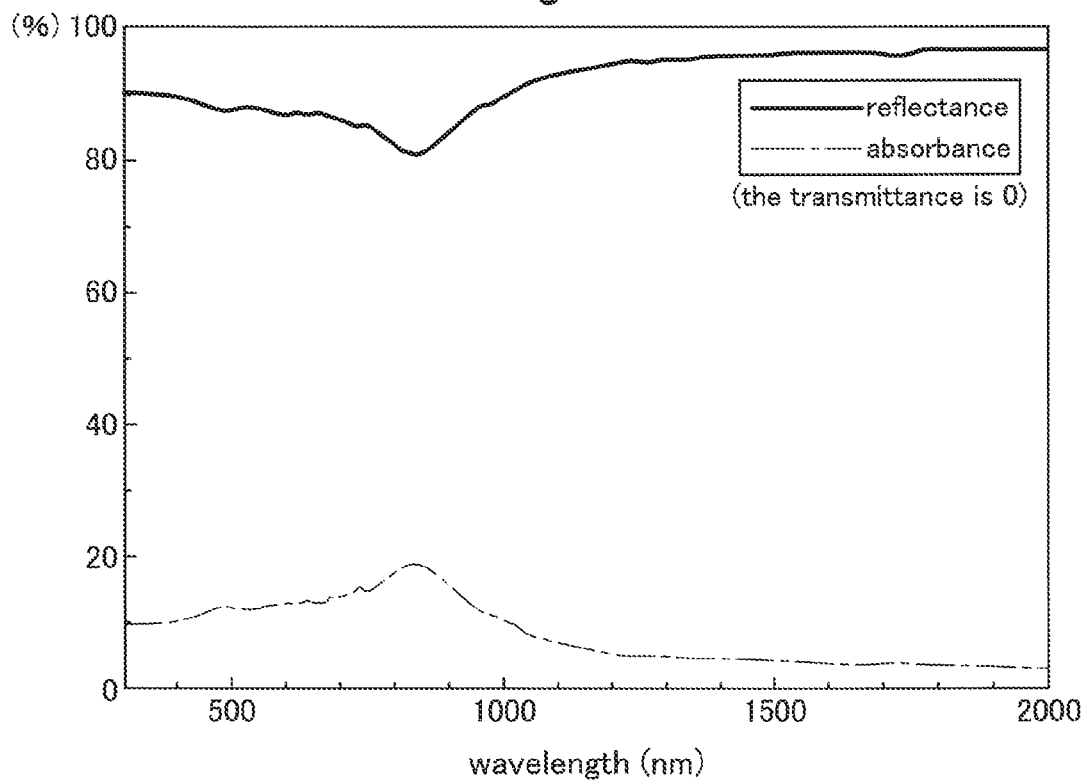
FIG. 12 is a graph showing a reflectance, a transmittance, and an absorbance relating to the second reference arrangement.
Figure 14:
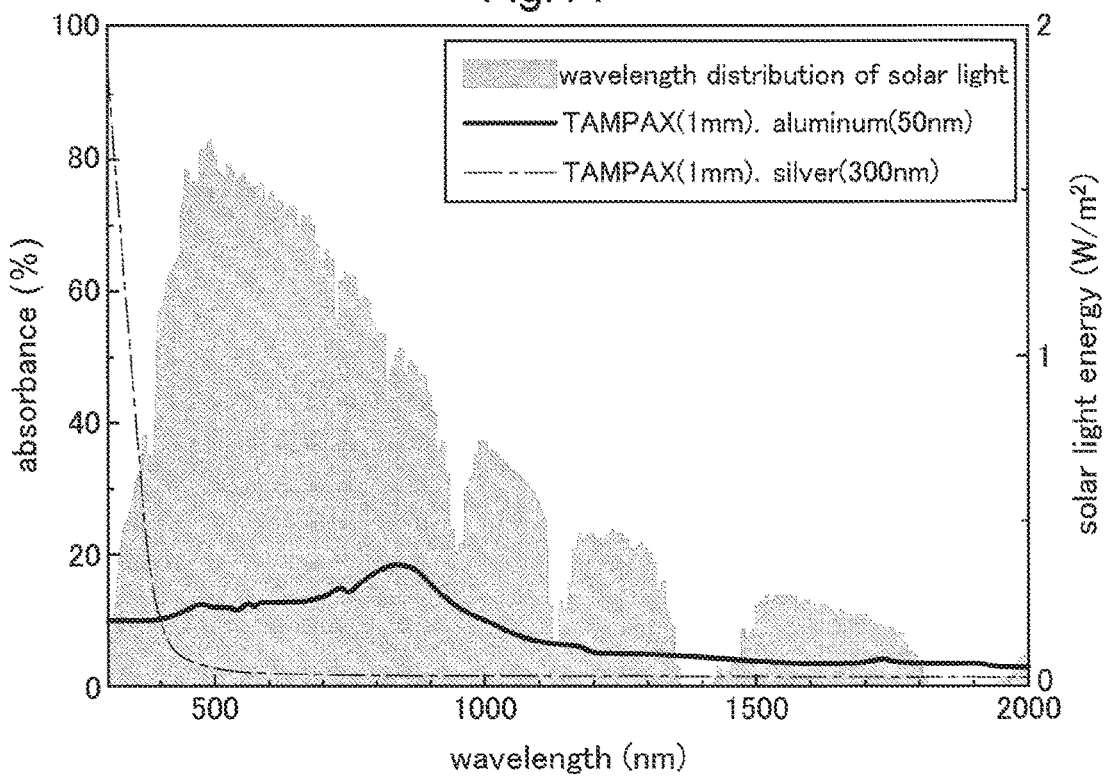
FIG. 14 is a graph showing absorbances of the first reference arrangement and the second reference arrangement.

However, as shown in FIG. 12, aluminum has a tendency of having high absorbance for solar light. Moreover, as shown in FIG. 14, aluminum (membrane thickness of 50 nm) absorbs more solar light than silver (membrane thickness of 300 nm).

Figure 15:
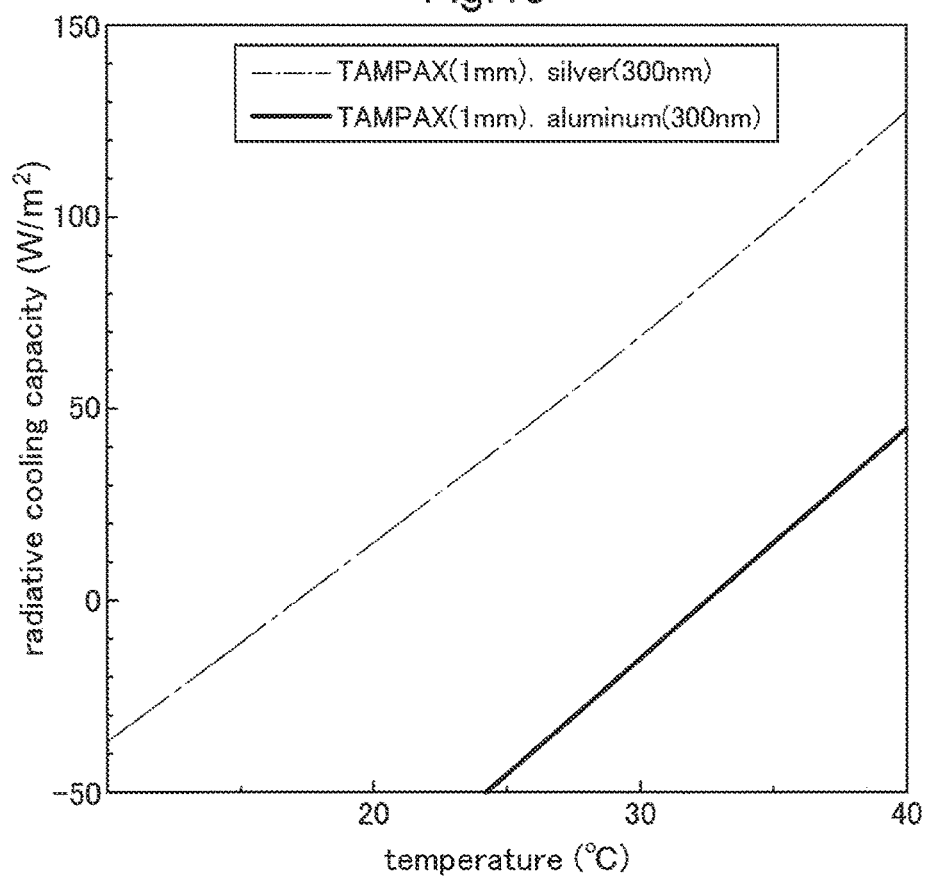
FIG. 15 is a graph showing cooling capacities of the first reference arrangement and the second reference arrangement.

As a result, as shown in FIG. 15, in case the light reflective layer B is constituted of the second layer B2 alone and the membrane thickness (thickness) of aluminum constituting the second layer B2 is set to 300 nm, the radiative cooling capacity at the time of meridian passage at 30° C. outside temperature becomes −14.7 W/cm$^2$, thus causing heat generation. Incidentally, in the above, occurrence of cooling is represented by the positive sign and occurrence of heat generation is represented by the negative sign.

Incidentally, as shown in FIG. 15, in the case of constituting the light reflective layer B of the first layer B1 alone and the membrane thickness (thickness) of silver constituting the first layer B1 is set to 300 nm, the radiative cooling capacity at the time of meridian passage at 30° C. outside temperature becomes 70 W/cm$^2$, approximately.

As described above, based on the FIGS. 11 through 15 illustrations, explanation has been made on the problem that occurs when the light reflective layer B is constituted of the second layer B2 alone.

Namely, it may be understood that it is not possible to make the radiative cooling capacity of the radiative cooling device CP sufficient in the case of constituting the light reflective layer B of the second layer B2 alone.

Then, as the result of the extensive and intensive research efforts made by the present inventors, it has been found that if the light reflective layer B of the radiative cooling device CP is constituted of the first layer B1 and the second layer B2, it is possible to make the radiative cooling capacity sufficient while reducing the membrane thickness (thickness) of silver constituting the first layer B1.

More particularly, as shown in FIG. 9, the transmittance of silver constituting the first layer B1 becomes greater on the shorter wavelength side and becomes also greater with reduction in the membrane thickness (thickness).

Figure 18:
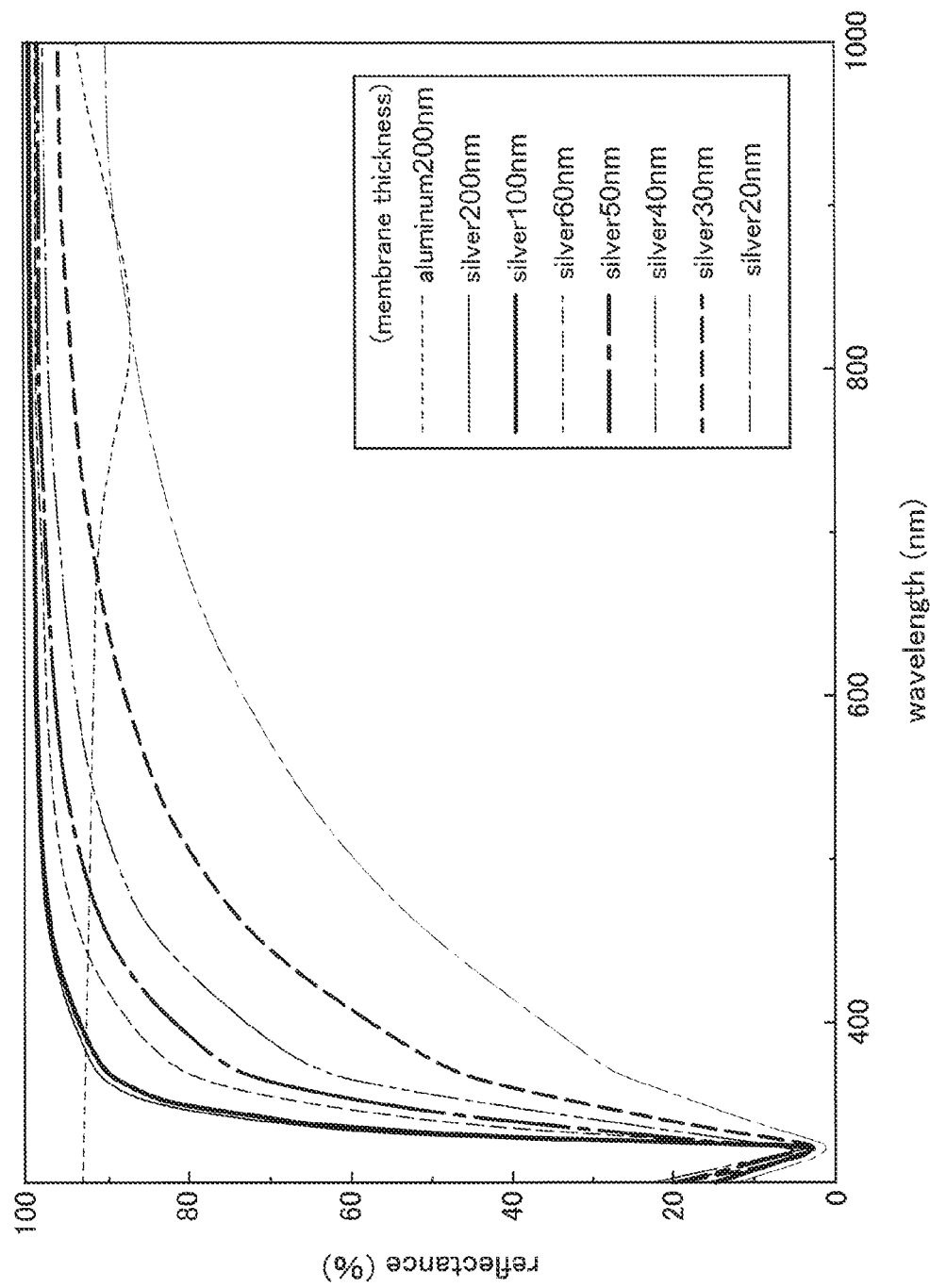
FIG. 18 is a graph showing relation between the membrane thickness and reflectance of silver.

Further, as shown in FIG. 18, the reflectance silver constituting the first layer B1 becomes greater on the longer wavelength side and becomes smaller on the shorter wavelength side, and also this becomes smaller with reduction in the membrane thickness (thickness).

Moreover, aluminum of the second layer B2, as described above, has a high reflectance capable of appropriately blocking solar light transmission if it has a membrane thickness (thickness) equal to or greater than 25 nm and it also has the tendency of a high reflectance on the shorter wavelength side where the reflectance of silver becomes smaller and a low reflectance on the longer wavelength side where the reflectance of silver becomes higher.

Incidentally, as shown in FIG. 19, the wavelength where the reflectance of silver and the reflectance of aluminum cross each other (this will be referred to in short as "crossing wavelength" hereinafter) varies with the membrane thickness (thickness) of silver.

FIG. 19 illustrates such crossing wavelengths with variation of the silver membrane thickness (thickness) in case the membrane thickness (thickness) of aluminum is fixed to 200 nm.

Figure 16:
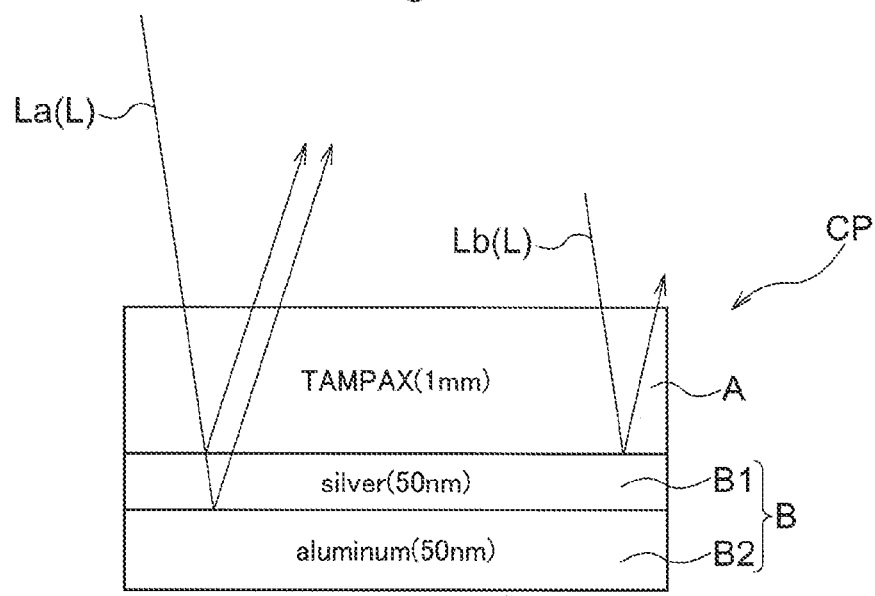
FIG. 16 is a view showing a basic arrangement of the radiative cooling device.
Figure 17:
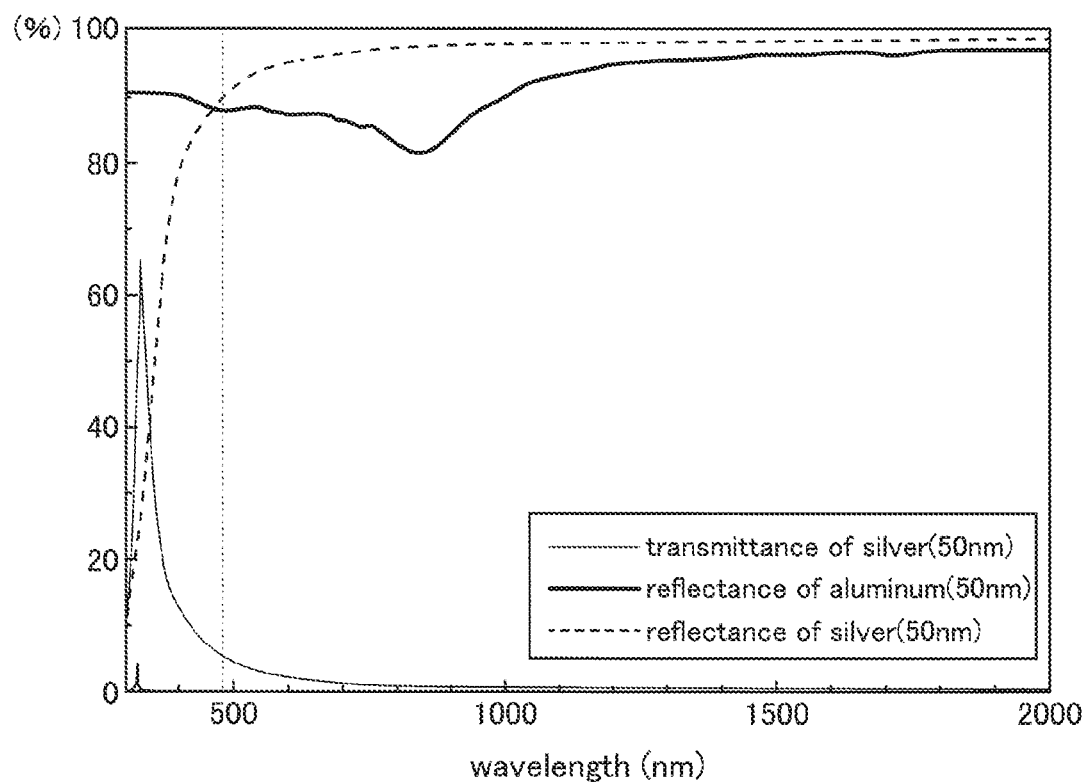
FIG. 17 is a view comparing transmittance and reflectance of silver and aluminum in the basic arrangement.

For this reason, as shown in FIG. 16, in the case of constituting the light reflective layer B of the first layer B1 and the second layer B2, if e.g. the membrane thickness (thickness) of silver constituting the first layer B1 is set to 50 nm and the membrane thickness (thickness) of aluminum constituting the second layer B2 is set to 50 nm. Then, as shown in FIG. 17, the crossing wavelength becomes 450 nm, for light La on the shorter wavelength side than 450 nm, aluminum has a higher reflectance than silver and for light Lb on the longer wavelength side than 450 nm, silver has a higher reflectance than aluminum.

Incidentally, as shown in FIG. 9, light having a wavelength shorter than 450 nm as the crossing wavelength can be easily transmitted through silver, and this transmitted light will be irradiated onto the aluminum of the second layer B2.

Namely, as shown in FIG. 16, the light La on the shorter wavelength side than 450 nm will be reflected by the first layer B1 formed partially of silver and the light transmitted through the first layer B1 will be reflected by the second layer B2 formed of aluminum.

Further, the light Lb on the longer wavelength side than 450 nm will be reflected mainly by the first layer B1.

Also, in the case of constituting the light reflective layer B of the first layer B1 and the second layer B2, if the membrane thickness (thickness) of aluminum constituting the second layer B2 is greater than 10 nm, almost no transmission of light will occur. So, the membrane thickness (thickness) of the second layer B2 is to be set to equal to or greater than 10 nm.

Incidentally, when improvement of corrosion resistance is contemplated, it is preferred that the membrane thickness (thickness) of aluminum constituting the second layer B2 be equal to or greater than 50 nm. This is because aluminum is oxidized to form a passivation state, but durability improves with increase in thickness of its layer capable of forming such passivation state.

Therefore, in the case of constituting the light reflective layer B of the first layer B1 and the second layer B2, if the membrane thickness (thickness) of silver of the first layer B1 is set to 50 nm and the membrane thickness (thickness) of aluminum of the second layer B2 is set to 50 nm, light in the wavelength range on the longer wavelength side than 450 nm for which aluminum provides high light absorbance will be reflected mainly by silver of the first layer B1 and light having wavelength equal to or smaller than 450 nm transmitted through silver will be reflected mainly by aluminum of the second layer B2, whereby light or radiation transmitted through the infrared radiative layer A can be reflected in an efficient manner.

As described above, in the case of constituting the light reflective layer B of the first layer B1 and the second layer B2, by reflecting light on the longer wavelength side than the crossing wavelength mainly by the silver of the first layer B1 and reflecting light on the shorter side than the crossing wavelength transmitted through the silver mainly by the aluminum of the second layer B2, it is possible to reflect the light or the like transmitted through the infrared radiative layer A in an efficient manner.

Consequently, with the radiative cooling device CP in which the light reflective layer B is constituted of the first layer B1 and the second layer B2, the reflectance of solar light can be improved sufficiently by setting the membrane thickness (thickness) of the first layer B1 to equal to or less than 100 nm and equal to or greater than 50 nm.

Studying again the cooling capacity shown in FIG. 4 (radiative cooling performance), in consideration to the supplementary explanation based on FIGS. 7 through 19 illustrations, in the case of constituting the light reflective layer B of the first layer B1 alone, when the membrane thickness of silver becomes equal to or less than 100 nm, the solar light will be transmitted through the radiative cooling device CP to heat the cooling target D, so the radiative cooling capacity (radiative cooling performance) will deteriorate.

For this reason, in the case of constituting the light reflective layer B of the first layer B1 alone, in comparison with the case of completely blocking the transmission of solar light by setting the membrane thickness (thickness) of silver to 300 nm, there will occur about 10% reduction in the radiative cooling capacity (radiative cooling performance) if the membrane thickness (thickness) of the silver is set to 80 nm.

And, if the membrane thickness (thickness) of the silver is set to less than 40 nm, there will occur significant reduction in the radiative cooling capacity (radiative cooling performance) and if it is set to equal to or less than 30 nm, the cooling target D will be heated.

In contrast, in the case of constituting the light reflective layer B of the first layer B1 and the second layer B2, as described above, if the thickness of the silver of the first layer B1 is greater than 3.3 nm, the radiative cooling device CP will provide the radiative cooling capacity (radiative cooling performance).

Moreover, when the thickness of the silver forming the first layer B1 ranges from 50 nm to 100 nm, the radiative cooling capacity (radiative cooling performance) of the radiative cooling device CP becomes equivalent to the capacity of the case of setting the silver thickness to 300 nm in the case of constituting the light reflective layer B of the first layer B1 alone (see FIG. 2).

OTHER EMBODIMENTS

Next, other embodiments will be recited on after another.

(1) In the foregoing embodiment, there was disclosed the exemplary case in which the first layer B1 and the second layer B2 are stacked on the infrared radiative layer A as a substrate. Alternatively, on a substrate different from the infrared radiative layer A, the second layer B2 and the first layer B1 may be stacked to form the light reflective layer B, with the infrared radiative layer A and the light reflective layer B being superposed each other. In this case, a certain gap may be present as long as it is still capable of heat conduction, between the infrared radiative layer A and the light reflective layer B.

(2) In the foregoing embodiment, there was disclosed the exemplary case of the anti-oxidization layer 4 being provided. However, in case e.g. the membrane thickness (thickness) of the second layer B2 formed of aluminum is sufficiently large, the anti-oxidization layer 4 may be omitted.

(3) In the foregoing embodiment, detailed explanation was made on the case of forming the first layer B1 of silver. However, the membrane thickness (thickness) in the case of forming the first layer B1 of a silver alloy may be about same as the membrane thickness (thickness) of the case of forming the first layer B1 of silver.

(4) In the foregoing embodiment, detailed explanation was made on the case of forming the second layer B2 of aluminum. However, the membrane thickness (thickness) in the case of forming the second layer B2 of an aluminum alloy may be about same as the membrane thickness (thickness) of the case of forming the second layer B2 of aluminum.

Incidentally, the arrangements disclosed in the foregoing embodiment (including the other embodiments, same hereinafter) may be used in any combination with the arrangement(s) disclosed in the other embodiments as long as no contradiction results from such combination. Further, the embodiments disclosed in this detailed disclosure are only exemplary, and embodiments of the present invention are not limited thereto, by various changes and modifications will be possible in a range not deviating from the object of the present invention.

DESCRIPTION OF SIGNS

3: gapless contact layer
4: anti-oxidization layer
A: infrared radiative layer
B: light reflective layer
B1: first layer
B2: second layer

The invention claimed is:

1. A radiative cooling device comprising:
   an infrared radiative layer for radiating infrared light from a radiative surface; and
   a light reflective layer disposed on an opposite side of a presence side of the radiative surface of the infrared radiative layer,
   wherein the infrared radiative layer and the light reflective layer are provided in a mutually stacked state,
   wherein the light reflective layer is arranged such that a first layer made of silver or silver alloy and a second layer made of aluminum or aluminum alloy are stacked with the first layer being disposed on a side of the light reflective layer close to the infrared radiative layer,
   wherein the first layer has a thickness of 50 nm or greater and 100 nm or less, and
   wherein the second layer has a thickness of 25 nm or greater and 50 nm or less.

2. The radiative cooling device of claim 1, wherein the infrared radiative layer comprises glass selected from the group consisting of alkali free glass, crown glass and borosilicate glass.

3. The radiative cooling device of claim 2, wherein the infrared radiative layer is used as a substrate, on which the first layer and the second layer are stacked.

4. The radiative cooling device of claim 3, wherein on a side of the second layer opposite to the presence side of the first layer, an anti-oxidization layer is stacked.

5. The radiative cooling device of claim 1, wherein the infrared radiative layer is used as a substrate, on which the first layer and the second layer are stacked.

6. The radiative cooling device of claim 5, wherein a gapless contact layer is stacked between the infrared radiative layer and the first layer.

7. The radiative cooling device of claim 5, wherein on a side of the second layer opposite to the presence side of the first layer, an anti-oxidization layer is stacked.

* * * * *